United States Patent [19]
Grillo et al.

[11] Patent Number: 5,103,170
[45] Date of Patent: Apr. 7, 1992

[54] ANTIFRICTION BEARING WITH A CLIP-ON SENSOR

[75] Inventors: John M. Grillo, Torrington; James A. Hilby, Watertown; Vern Van Fleet, Wolcott; Cameron G. Gardella, Woodbury; Gary J. Hill, Collinsville, all of Conn.

[73] Assignee: The Torrington Company, Torrington, Conn.

[21] Appl. No.: 680,437

[22] Filed: Apr. 4, 1991

Related U.S. Application Data

[62] Division of Ser. No. 515,031, May 21, 1990, which is a division of Ser. No. 315,624, Feb. 24, 1989, Pat. No. 4,940,936.

[51] Int. Cl.[5] .................. G01P 3/488; F16C 32/00
[52] U.S. Cl. .................................. 324/173; 324/174; 384/448
[58] Field of Search ............... 324/173, 174, 127, 133, 324/207.13, 207.22, 207.25; 310/168; 384/448

[56] References Cited

U.S. PATENT DOCUMENTS

| | | | |
|---|---|---|---|
| 3,056,922 | 10/1962 | Du Vall et al. | 324/127 |
| 3,719,841 | 3/1973 | Ritsema | 324/174 |
| 3,793,545 | 2/1974 | Leiber et al. | 310/168 |
| 4,375,617 | 3/1983 | Schweitzer, Jr. | 324/133 |
| 4,732,034 | 3/1988 | Bjorn | 324/173 |
| 4,794,329 | 12/1988 | Schweitzer, Jr. | 324/127 |
| 4,820,979 | 4/1989 | Schwerdhofer et al. | 324/173 X |
| 4,898,079 | 2/1990 | Combette | 324/207.13 X |
| 5,011,303 | 4/1991 | Caron | 384/448 |

Primary Examiner—Gerard R. Strecker
Attorney, Agent, or Firm—John C. Bigler; Michael H. Minns

[57] ABSTRACT

An antifriction bearing assembly has rolling elements and a magnetic encoder ring housed in an outer ring with two portions which can have different diameters. A sensor is removably attached to the outer ring in alignment with the encoder ring. Various seal assembly configurations may be used to seal the bearing while accommodating the sensor.

8 Claims, 11 Drawing Sheets

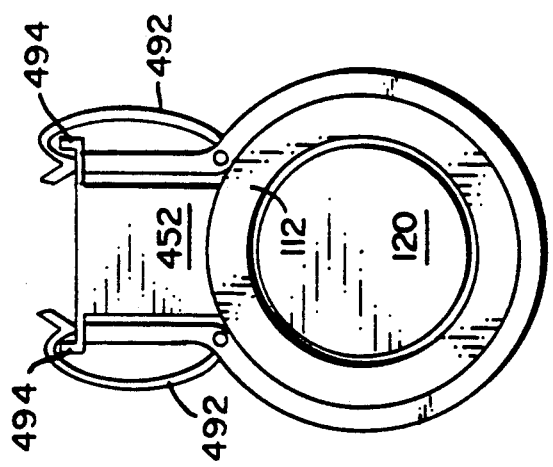
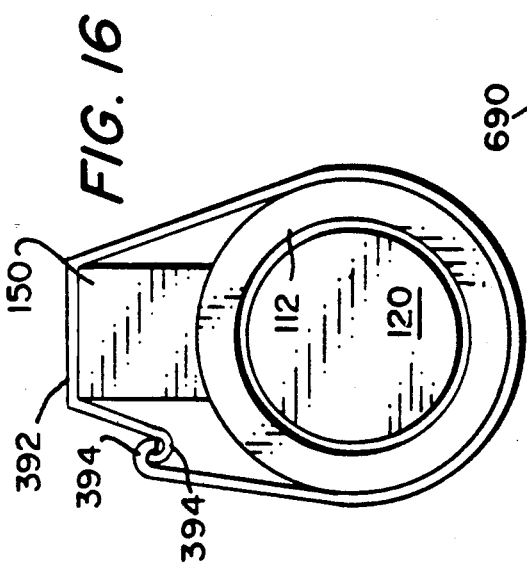
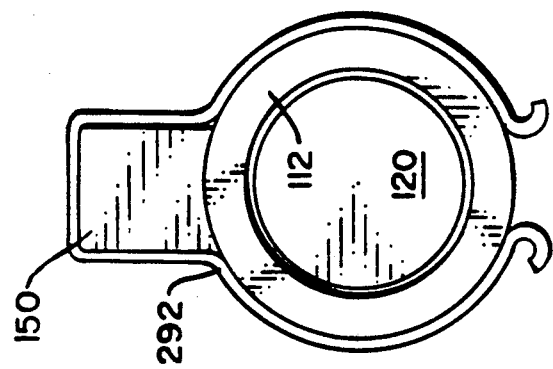
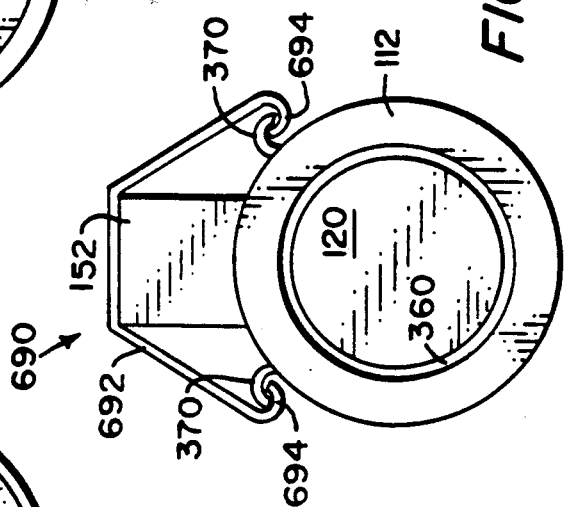
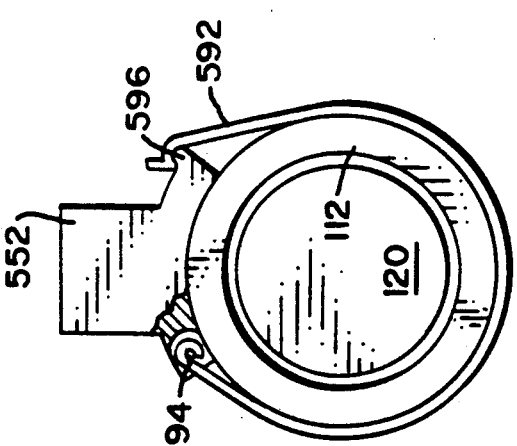

ANTIFRICTION BEARING WITH A CLIP-ON SENSOR

This is a division of application Ser. No. 515,031 filed May 21, 1990, which is a division of application Ser. No. 315,624 as originally filed on Feb. 24, 1989, now U.S. Pat. No. 4,940,936.

This invention relates to antifriction bearings used in conjunction with a speed sensor assembly; more particularly, it relates to bearings used with an encoder ring attached to a rotating shaft and a sensor which is removably attached to a stationary member in alignment with the encoder ring so as to allow the sensor to detect the passage of alternating magnetic poles. This invention is particularly well-suited for use in a wheel spindle bearing, e.g., in a rear wheel bearing of a rear-wheel drive vehicle.

Prior art patents disclose structures which combine spindle bearings with sensor assemblies in various configurations so as to provide an electrical output signal whose frequency is proportional to the rotational speed of the associated axle or shaft. An example of this type of prior art is disclosed in U.S. Pat. No. 4,732,494 for a "Bearing Or Roller Bearing With Data Sensor" issued in the names of Roger Guers and Georges Godard on Mar. 22, 1988. Other prior art patents disclose various means for attaching a magnetic encoder ring to a rotating shaft when the encoder ring is not attached directly to a bearing component. An example of this type of prior art is disclosed in European Patent Application No. 86305758.4 for a "Magnetic Ring For Detecting The Rotation Of An Object" filed in the names of inventors Kenji Hattori and Shinichi Tanaka, and in the names of applicants Honda Giken Kogyo Kabushiki Kaisha, and Dainippon Ink and Chemicals, Inc. on July 25, 1986, and published on Nov. 3, 1987.

One of the main problems with the prior art is that the sensor is normally installed in the bearing assembly, or in close proximity to a bearing, so that the sensor becomes a relatively permanent part of the assembly. Repair and maintenance problems require extensive disassembly of adjacent components in order to gain access to the sensor. Normally, the entire bearing assembly must be replaced in order to correct a problem with the sensor. Another problem with the prior art is that of magnetic encoder ring retention on a rotating shaft. Often, the magnetic encoding means is provided by the magnetic flux concentration action of the teeth of a gear wheel, or tone wheel, which is assembled onto a rotatable shaft. This method is used with variable reluctance sensor systems which do not adequately address the problem of retaining an encoder ring on a rotating shaft, where the magnetic encoder ring is made of a synthetic resin material having magnetic material embedded in the ring.

The bearing assembly of the present invention overcomes these problems with a removable sensor and an encoder retainer ring. The sensor can be serviced or individually replaced in a relatively easy manner. The encoder retainer ring provides proper mechanical support for a synthetic resin encoder ring.

Briefly described, the bearing assembly of the present invention comprises a bearing with an outer ring having two portions with different diameters. The outer ring also houses a magnetic encoder ring, attached to a rotatable shaft by an encoder retainer ring, and accommodates a clip-on assembly for the sensor. In addition, a unique seal assembly accommodates a sensor mount utilized in the clip-on sensor assembly. A modified embodiment of the bearing assembly utilizes a modified seal assembly installed inside one end of the outer ring.

This invention may be better understood by reference to the following detailed description and drawings in which:

FIG. 15 is an end view of a modified embodiment of the clip-on arrangement for the bearing assembly sensor, comparable to the view shown in FIG. 4;

FIG. 16 is an end view of a second modified embodiment of the sensor clip-on arrangement;

FIG. 17 is an end view of a third modified embodiment of the sensor clip-on arrangement;

FIG. 18 is an end view of a fourth modification of the sensor clip-on arrangement;

FIG. 19 is an end view of a fifth modification of the sensor clip-on arrangement, utilizing the modified seal assembly shown in FIG. 13.

In the various figures, like parts are referred to by like numbers.

Figure 1:
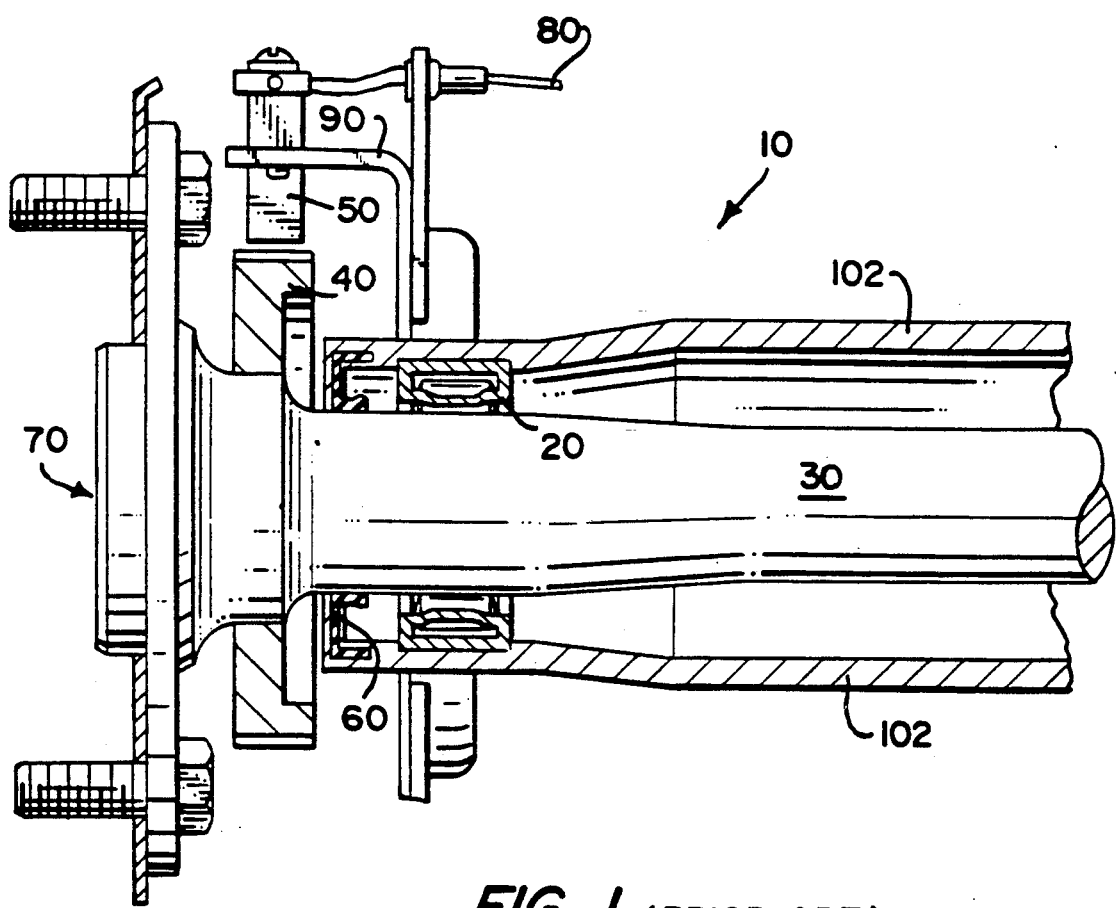
FIG. 1 is a side sectional view of a typical prior art bearing assembly presently in use.

Referring to the drawings, and more particularly to FIG. 1, a prior art bearing assembly 10 presently in use is illustrated. The bearing assembly comprises a radial bearing 20 mounted on a shaft 30, a magnetic tone wheel 40, a sensor 50 which detects or senses magnetic field perturbations caused by the teeth of tone wheel 40 passing sensor 50, a seal assembly 60, and a wheel and hub assembly 70. The electrical output signal from sensor 50 is transmitted via lead 80, and sensor 50 is held in alignment with tone wheel 40 by a support bracket 90.

Figure 2:
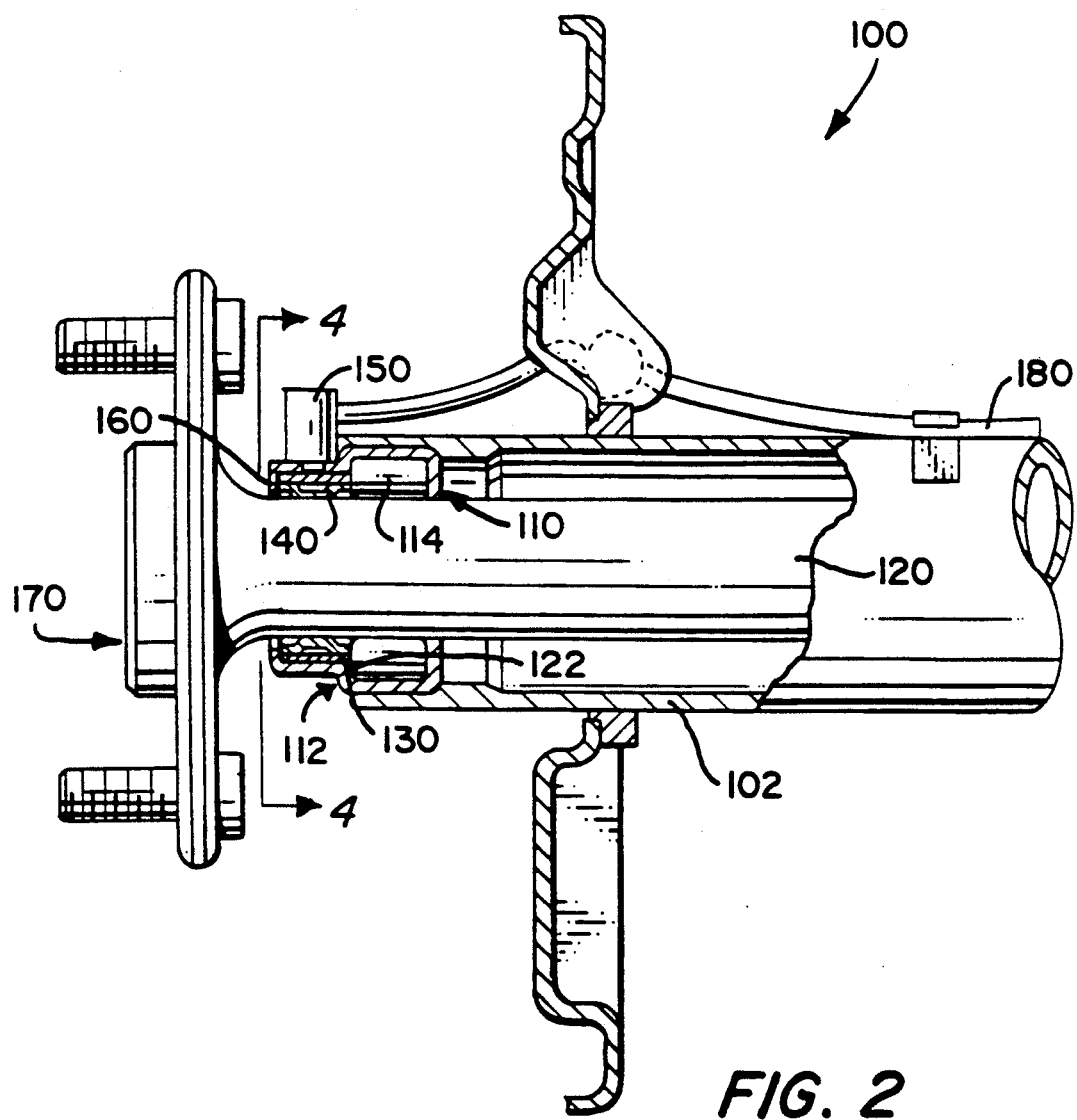
FIG. 2 is a side sectional view of the preferred embodiment of the bearing assembly of the present invention.
Figure 3:
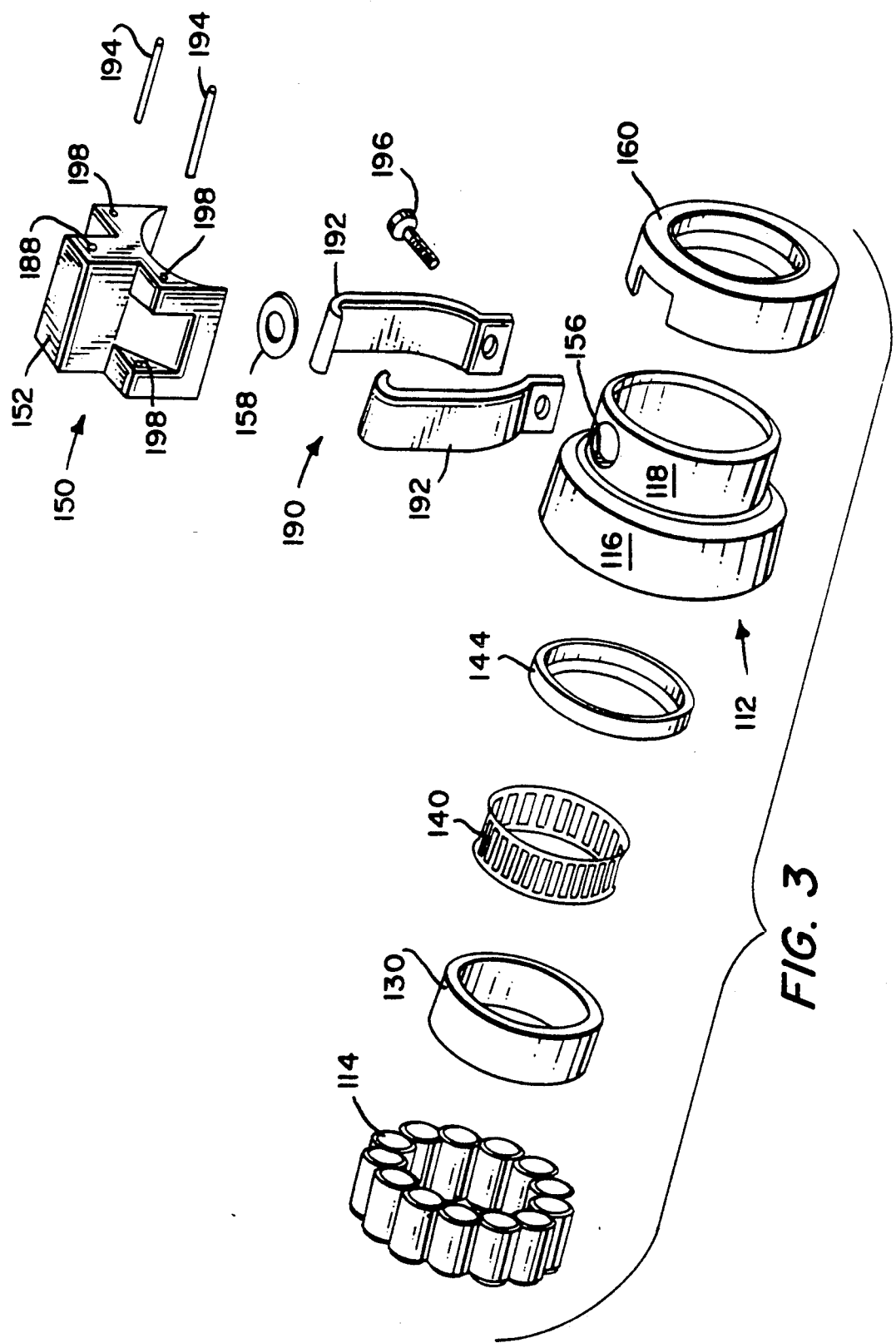
FIG. 3 is an exploded view of the bearing assembly shown in FIG. 2.
Figure 4:
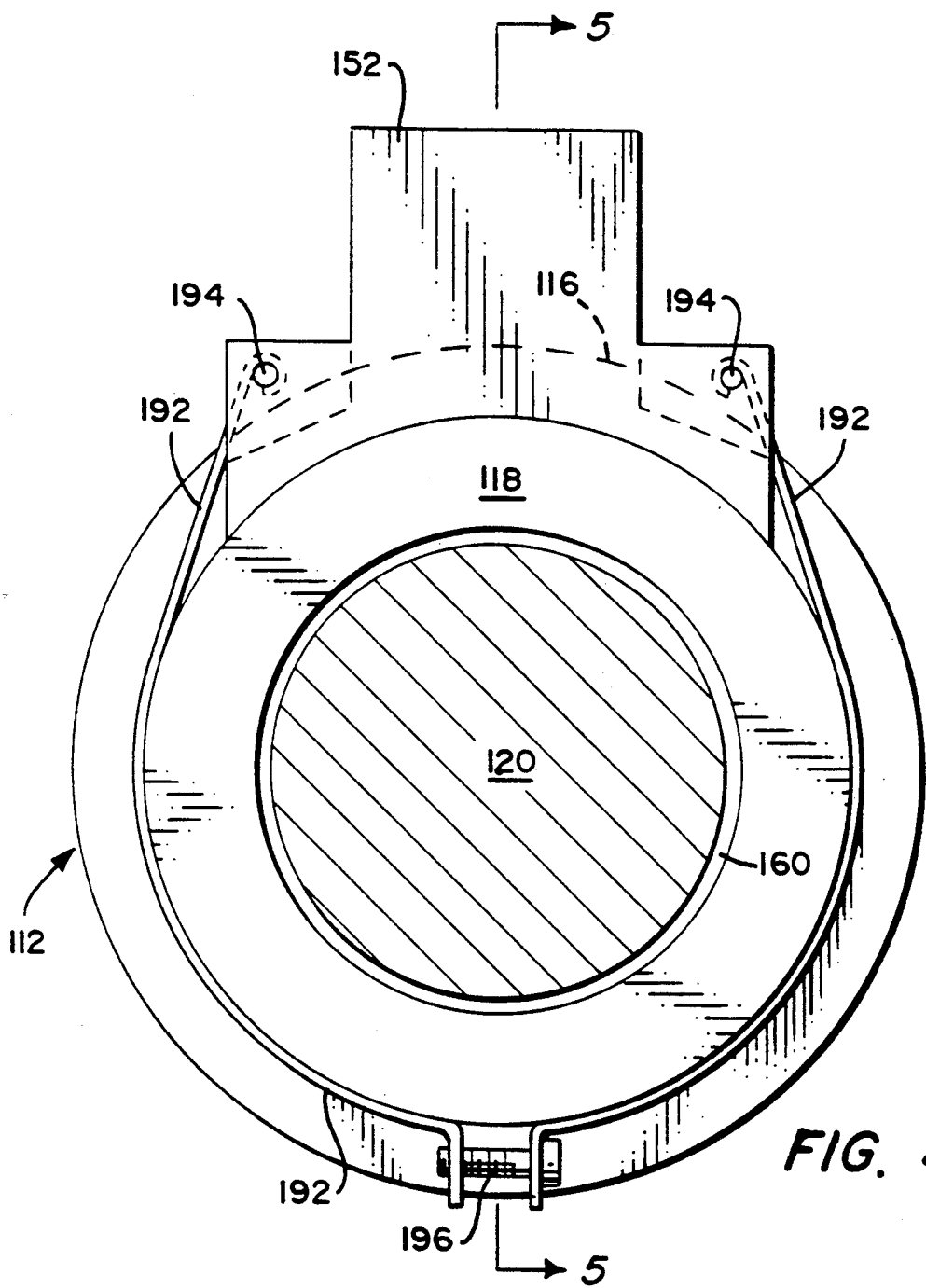
FIG. 4 is an end view of the clip-on sensor arrangement shown in FIGS. 2 and 3, taken along line 4—4 in FIG. 2.

Turning now to FIGS. 2 and 3, the preferred embodiment of the bearing assembly 100 of the present invention comprises a radial bearing 110 mounted in an axle tube 102 around a shaft 120, a magnetic encoder ring 130 mounted on an encoder retainer ring 140, a sensor assembly 150 for detecting the magnetic encoded signal from encoder ring 130, a seal assembly 160, a wheel and hub assembly 170, and an output lead 180 for transmitting the output signal from sensor assembly 150. The sensor assembly 150 is replaceably attached to an outer ring 112 by a clip-on assembly 190. The wheel and hub assembly 170 is located on the outer side of bearing assembly 100, and the opposite side of assembly 100 is the inner side.

The radial bearing 110 has a full complement of rolling elements 114 housed in outer ring 112. It should be noted that rolling elements 114 could be retained by a cage or a retainer in alternative bearing configurations. Outer ring 112 has two portions—a larger diameter portion 116 and a smaller diameter portion 118. The smaller diameter portion 118 has a lipped washer 144 installed in its outer axial end, adjacent to seal assembly 160, to provide a thrust surface to receive thrust loads during installation of the axle or shaft 120 into outer ring 112 and to receive the relatively small thrust load generated by the limited axial movement of the magnetic encoder ring 130 and to provide axial retention of rings 130, and 140 when seal assembly 160 is removed from ring 112 for some reason, such as maintenance or replacement. A shoulder 122 joins portions 116 and 118, and provides a surface for receiving thrust load from rolling elements 114; the encoder and retainer rings in portion 118 are thereby isolated from the thrust load.

Turning now to FIGS. 2-6, sensor assembly 150 comprises a sensor mount 152 and a sensor 154. The sensor protrudes from the bottom of mount 152 (see FIG. 6) so as to mate with an opening 156 in the smaller diameter portion 118 of outer ring 112. An O-ring seal 158 is installed around the sensor 154 and sits on top of outer ring portion 118 around opening 156. It can be seen from FIGS. 3, 4, and 6 that the bottom surface of mount 152 is curved in order to mate with the outer surface of outer ring portion 118. Sensor 154 is a Hall-effect sensor in the preferred embodiment; however, the sensor should not be limited to a Hall sensor.

Clip-on assembly 190 comprises two clips 192, two pins 194 for attaching clips 192 to sensor mount 152, and a fastener 196 to connect clips 192 together at their ends opposite sensor mount 152. Sensor mount 152 also has four bore holes 198, into which pins 194 are inserted. Each pin 194 is supported by a pair of holes 198 in mount 152 so as to leave the central portion of the pin exposed in order to allow a clip 192 to latch onto the pin. Sensor mount 152 also has an aperture 188 through its inner side surface to accommodate output lead 180. It should be noted that aperture 188 could be located anywhere on mount 152 as long as the output lead 180 can be adequately accommodated and routed to its desired destination.

Figure 7:
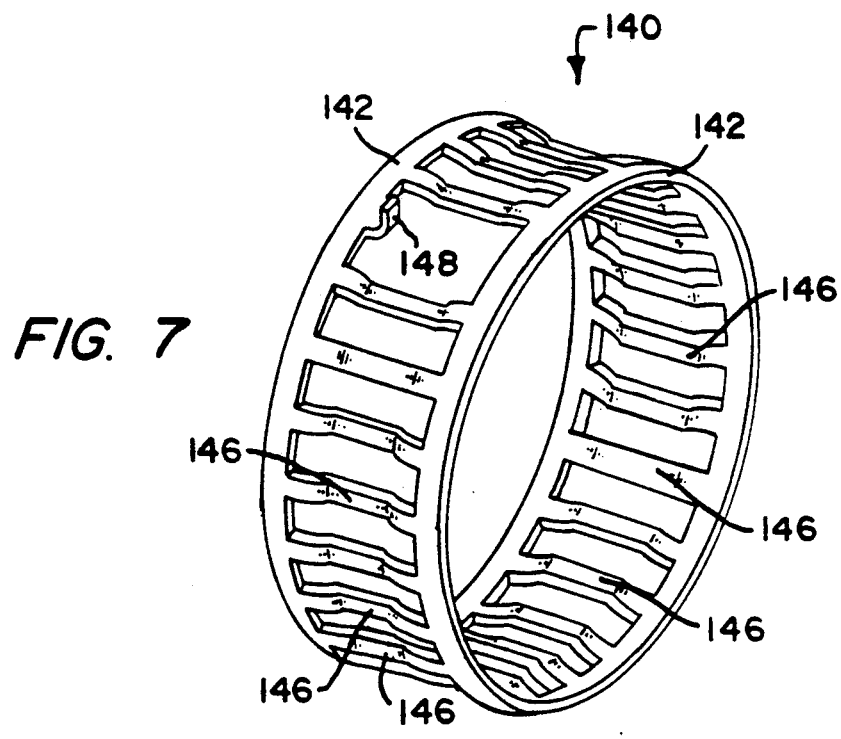
FIG. 7 is a perspective view of the preferred embodiment of the encoder retainer ring.
Figure 8:
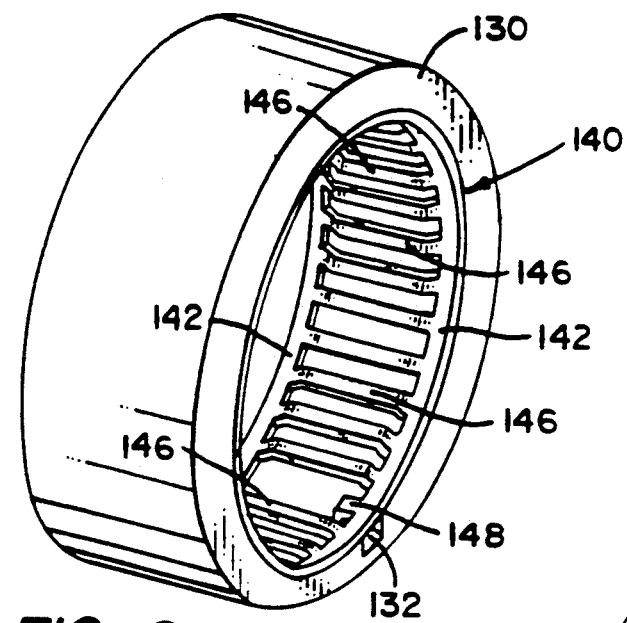
FIG. 8 is another perspective view of the same encoder retainer ring with a magnetic encoder ring shown mounted on the retainer ring.

Turning now to FIGS. 7 and 8, the preferred embodiment of the encoder retainer ring 140 is depicted. Ring 140 has two end rims 142 which are connected by a plurality of crossbars 146. The crossbars are bent slightly inwardly (see FIG. 5) in order to provide means for press fitting the ring 140 to a rotating shaft, or axle 120. The configurations of the end rims 142 and the crossbars 146 can be modified in numerous ways in order to provide the desired amount of force in the interference fit between the retainer ring 140 and the shaft 120. At least one of the crossbars 146 is partially cut, and the partial crossbar(s) bent radially outwardly as shown by partial crossbar 148 in FIG. 7. Partial crossbar 148 is then mated with a groove 132 in the magnetic encoder ring 130, thereby fastening ring 130 to retainer ring 140. Ring 140 is tightly attached to shaft 120, and encoder ring 130 is attached to retainer ring 140, so that magnetic encoder ring 130 rotates with shaft 120.

Figure 9:
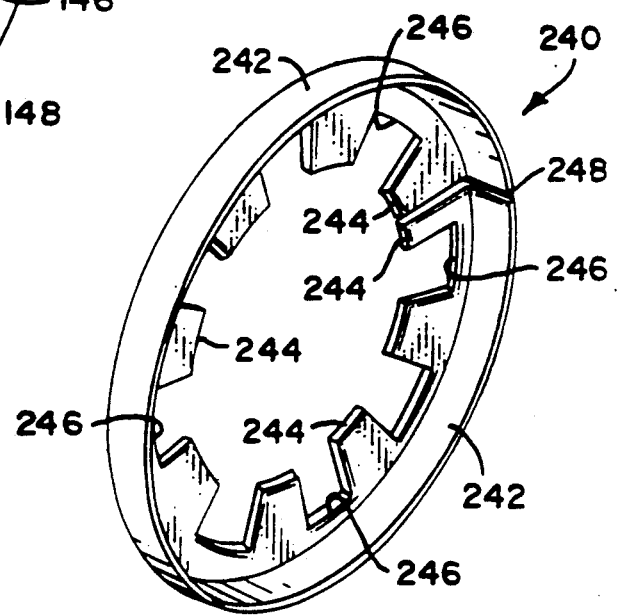
FIG. 9 is a perspective view of a modified embodiment of the encoder retainer ring.
Figure 10:
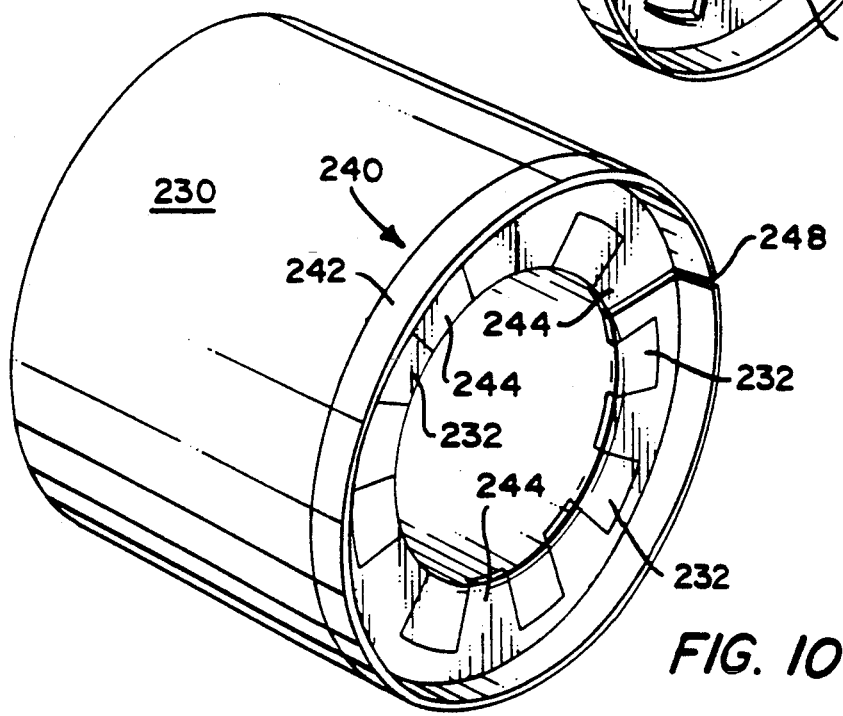
FIG. 10 is another perspective view of the same modified embodiment shown in FIG. 9, depicting the encoder retainer ring with a magnetic encoder ring attached to it.

Turning now to FIGS. 9 and 10, modified means for retaining a magnetic encoder ring 230 to shaft 120 is illustrated. A modified encoder retainer ring 240 comprises an annular flange 242, which extends axially, and a radial portion which projects inwardly from one axial end of flange 242 and comprises a plurality of castellated teeth 244 and grooves 246 between the teeth 244. These teeth make an interference fit with shaft 120 so that ring 240 is snugly attached to the shaft.

Ring 240 is split at 248 so that it can be spread open circumferentially to facilitate installation of the ring onto a shaft or axle. Magnetic encoder ring 230 is attached to retainer ring 240 by means of multiple fingers 232 which extend axially through matching grooves 246 (see FIG. 10). Fingers 232 ensure radial coupling between rings 230 and 240 so that magnetic encoder ring 230 rotates with shaft 120. The fingers may also be configured to limit axial movement of the encoder ring 230 by snapping into retainer ring 240, if desired, although axial movement would normally be limited by outer ring 112. Axial movement of magnetic encoder ring 230 could also be limited by installing a retainer ring 240 at each end of the encoder ring; in this case, encoder ring 230 would have fingers 232 projecting axially from both axial ends to match the grooves 246 in each of the two retainer rings 240.

Figure 11:
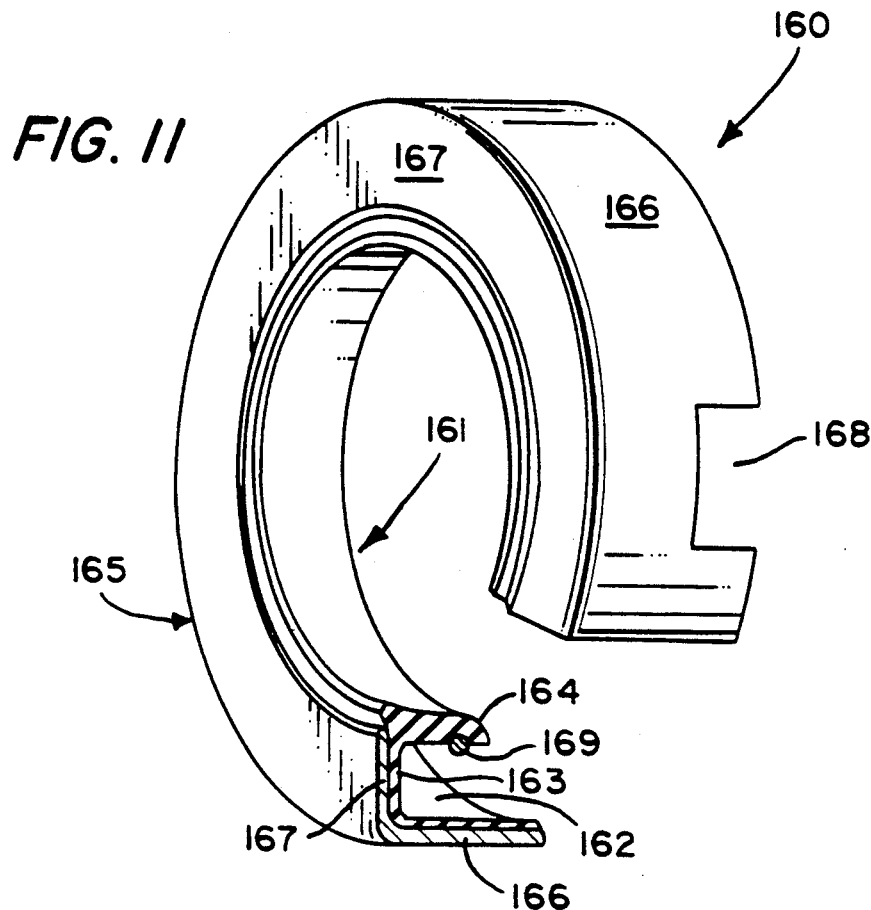
FIG. 11 is a partial perspective view of the preferred embodiment of the bearing assembly seal, including a sectional view of the seal.

FIG. 11 shows the preferred embodiment of the seal assembly 160 of the present invention. The seal assembly comprises a seal member 161 and a metallic member 165. Seal member 161 comprises an outer annular portion 162, a radial portion 163, and an inner annular portion 164. Seal member 161 is made of a rubber or rubber-like material; it could also be made of any suitable elastomeric material. A garter spring 169 presses annular portion 164 to shaft 120 to ensure a snug seal. Metallic member 165 also has an outer annular portion 166 and a radial portion 167. Portions 166 and 167 make a snug fit with outer annular portion 162 and radial portion 163, respectively, of seal member 161. Metallic member 165 provides additional sealing protection from the environment, e.g., moisture, contaminants, etc., for seal member 161 and the components inside outer ring 112.

Figure 5:
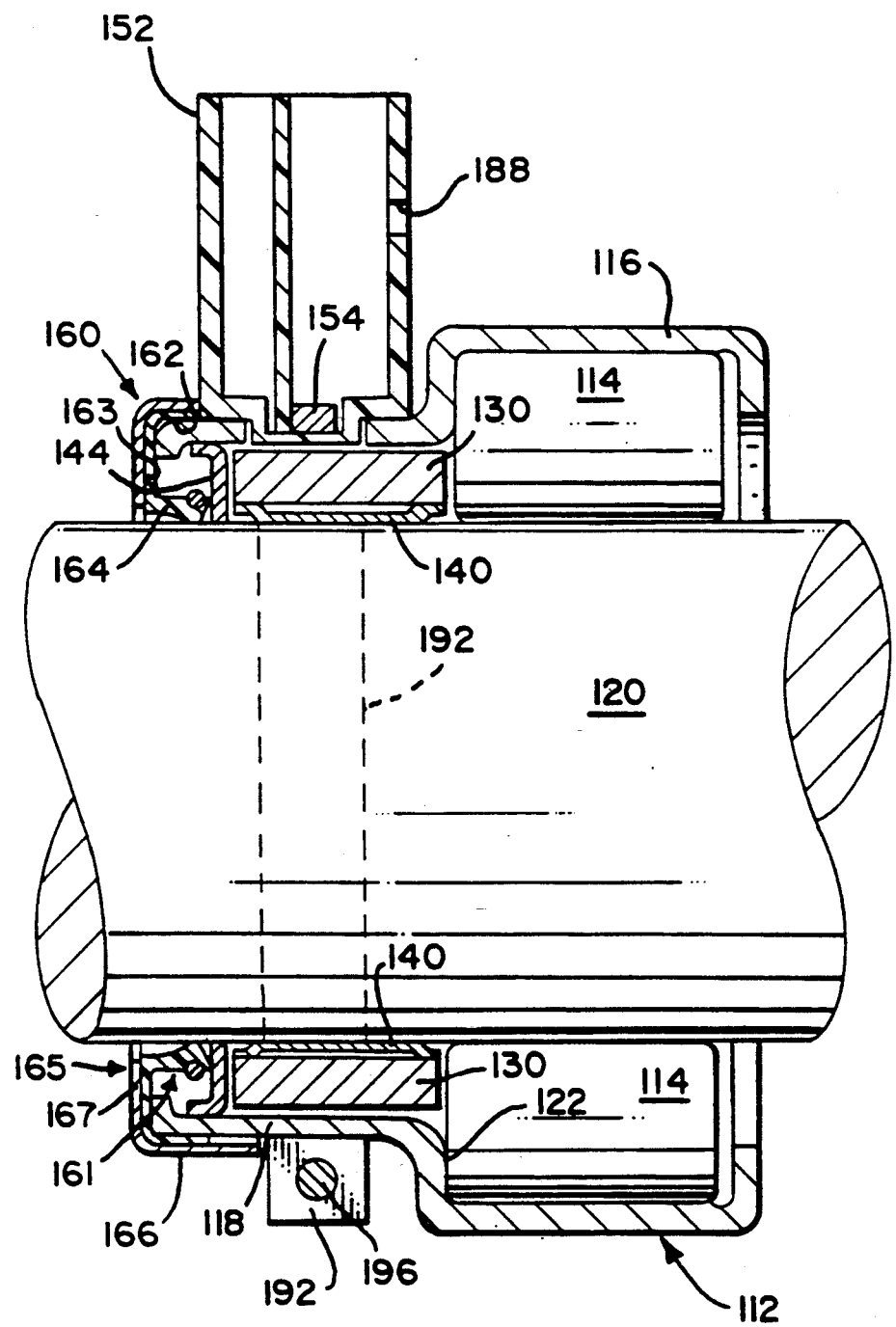
FIG. 5 is an enlarged side sectional view of the same bearing assembly taken along line 5—5 of FIG. 4.
Figure 6:
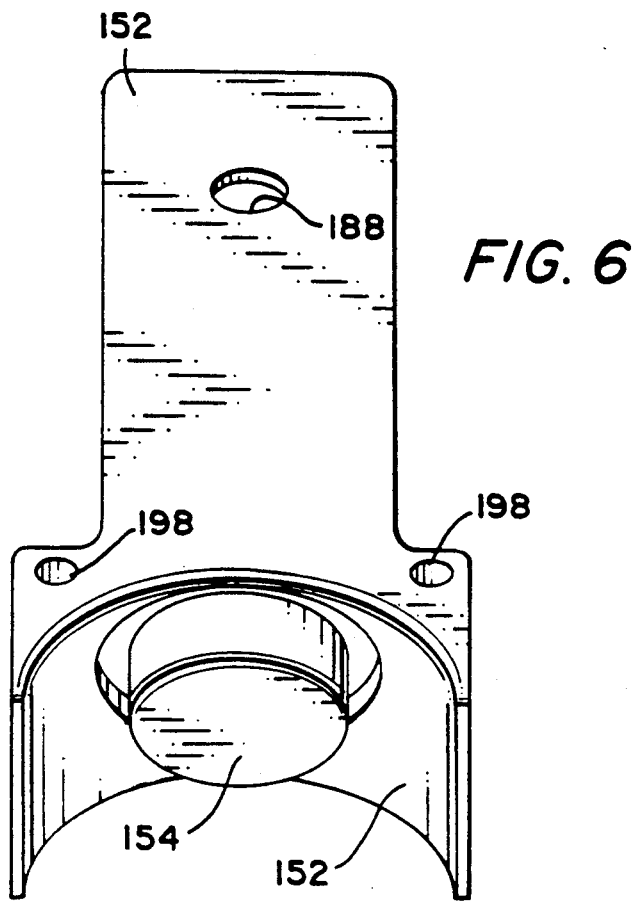
FIG. 6 is a perspective view of the sensor and sensor mount shown in FIGS. 4 and 5, showing the bottom of the mount.

Outer annular portions 162 and 166 make a snug press fit around the outer surface of the outer end of outer ring 112 (see FIGS. 2, 3, and 5). A rectangular aperture 168 penetrates the inner axial edge of portions 162 and 166 in order to accommodate the sensor mount 152 described above.

Figure 12:
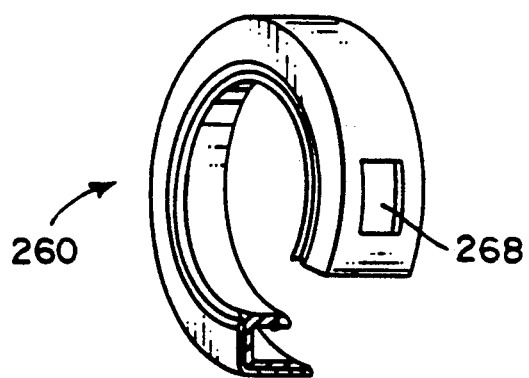
FIG. 12 is another perspective view, similar to FIG. 11, of a modified embodiment of the seal assembly.
Figure 13:
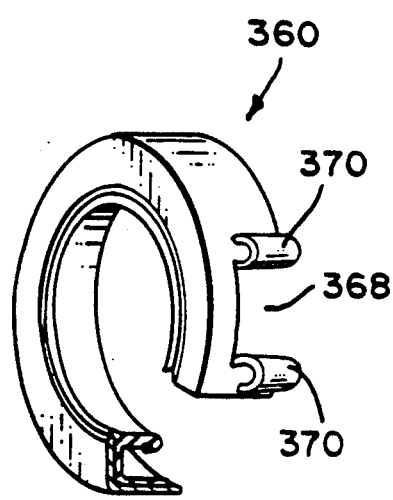
FIG. 13 shows a second modified embodiment of the bearing assembly seal in a view similar to FIGS. 11 and 12.

Two modified embodiments of the seal assembly are illustrated in FIGS. 12 and 13. Seal assembly 260 in FIG. 12 has a modified aperture 268 having four enclosed sides through portions 162 and 166, rather than only three sides. Otherwise, assemblies 160 and 260 are alike. Seal assembly 360 shown in FIG. 13 has an aperture 368 similar to aperture 168 in FIG. 11, except that adjacent to aperture 368 are two curled-back hook members 370 for connecting sensor mount 152 to the seal assembly 360. FIG. 19 shows a clip-on assembly 690 which could mate with seal assembly 360 by connecting to hook members 370.

Figure 14:
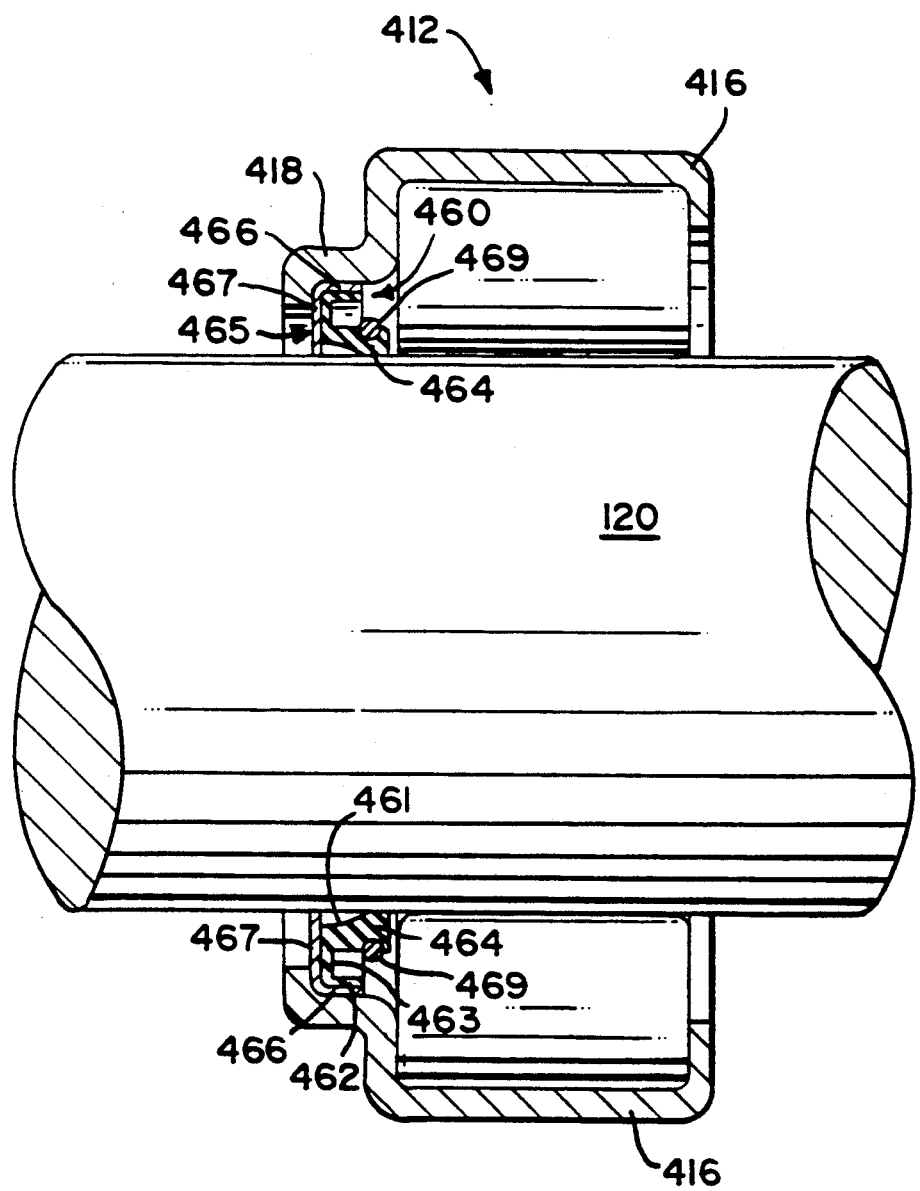
FIG. 14 is another modified seal assembly arrangement illustrated in a side sectional view.

FIG. 14 depicts an alternate embodiment 460 of the seal assembly which utilizes an outer ring 412, similar to outer ring 112 in FIG. 2, which has two portions—a larger diameter portion 416 and a smaller diameter portion 418. The seal assembly 460 is housed inside smaller diameter portion 418 so as to seal the annular space between shaft 120 and ring 412. Assembly 460 comprises a seal member 461 and a metallic member 465. Seal member 461 comprises an outer annular portion 462, a radial portion 463, and an inner annular portion 464. Metallic member 465 comprises an outer annular portion 466 and a radial portion 467. A garter spring 469 presses portion 464 against the shaft 120. It should be noted that portion 418 can be extended axially in order to accommodate rolling elements or an encoder ring, as desired.

Turning now to FIGS. 15-19, modified embodiments of the clip-on sensor arrangement 190 shown in FIGS. 2-6 are illustrated in end views which reveal how the sensor assemblies are clipped onto the outer ring 112. FIG. 15 depicts a one-piece clip 292 which fits over the sensor assembly 150 and the outer ring 112 without the aid of any additional fasteners, such as bolts or screws. FIG. 16 shows a one-piece clip 392 which fits around the sensor assembly and outer ring; the two ends of clip 392 are connected by interlocking the two hooks 394 at each end.

FIG. 17 illustrates a two-piece clip 492 which clips onto flanges 494 on the top sides of sensor mount 452. FIG. 18 depicts a one-piece clip 592 whose two ends attach to sensor mount 552 by means of a pin 594 on one side of mount 552 and by clipping onto a flange 596 on the other side of mount 552. Finally, the modified clip-on assembly 690 of FIG. 19 utilizes a modified clip 692 which is adapted to accommodate the modified seal assembly 360 of FIG. 13. The two hooked ends 694 of clip 692 mate with the two curled back hook members 370 of seal assembly 360.

Figure 20:
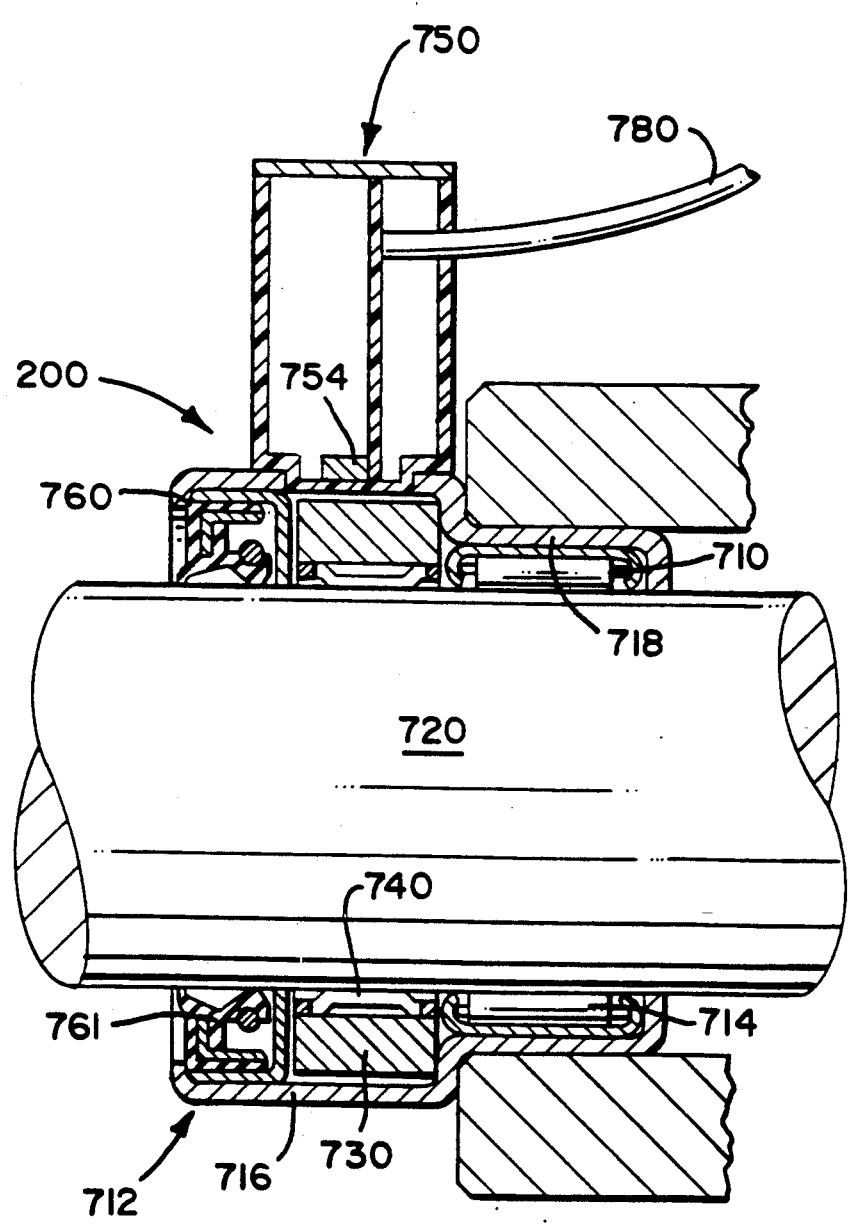
FIG. 20 is a side sectional view of a modified embodiment of the bearing assembly, comparable to the view shown in FIG. 2.

Turning finally to FIG. 20, a modified bearing assembly 200 comprises a radial bearing 710 mounted on a shaft 720 and housed in a smaller diameter portion 718 of an outer ring 712, a magnetic encoder ring 730, an encoder retainer ring 740, a sensor assembly 750, a seal assembly 760, an output lead 780 from sensor 754, and a clip-on assembly (not shown) similar to the assembly shown in FIGS. 2 and 3. It should be noted that the rolling elements 714 are housed in the smaller diameter portion 718 rather than the larger diameter portion 716; conversely, the encoder retainer ring 740 and the magnetic encoder ring 730 are housed in the larger diameter portion 716 instead of portion 718. It should also be noted that seal assembly 760 is similar to the modified seal assembly embodiment shown in FIG. 14, with the seal member 761 situated inside larger diameter portion 716 of outer ring 712 instead of fitting on the outside of the outer ring in a manner similar to that shown in the preferred embodiment (see FIGS. 2, 3, 5, and 11). The modified bearing assembly 200 is suitable for lighter load applications than the preferred embodiment assembly 100 of FIGS. 2 and 3.

We claim:

1. A sensor assembly in combination with a bearing assembly for sensing the rotational speed of a shaft, the combination comprising:

sensor means for detecting a coded magnetic signal produced by a magnetic encoder ring rotatable with the shaft so as to produce an output signal representative of the rotational speed of the shaft;

a bearing assembly adapted for mounting around the shaft and including a stationary outer ring to be supported within an axle tube and having an extension portion formed with an aperture and as a unitary part of the bearing assembly outer ring;

a sensor mount holding the sensor, the sensor mount being adapted to mate directly with the extension portion of the bearing assembly outer ring such that the sensor means protrudes from the sensor mount into the aperture of the extension portion of the bearing assembly outer ring; and clamp means for releasably holding the sensor mount against the extension portion of the bearing assembly outer ring such that the sensor means is held in alignment with the magnetic encoder ring.

2. The combination of a sensor assembly and bearing assembly according to claim 1, wherein the outer ring of the bearing assembly is adapted for insertion into an end of said axle tube with the extension portion of the outer ring of the bearing assembly protruding from the end of the axle tube such that the sensor means protrudes into the aperture of the extension portion of the bearing assembly outer ring without extending through the axle tube.

3. The combination of a sensor assembly and bearing assembly according to claim 1, wherein the sensor means is a Hall-effect sensor.

4. The combination of a sensor assembly and bearing assembly according to claim 1, wherein the sensor mount includes a curved surface conforming to an external surface of the extension portion of the outer ring of the bearing assembly.

5. The combination of a sensor assembly and bearing assembly according to claim 1, further comprising seal means between the extension portion of the bearing assembly outer ring and the shaft for providing a barrier to protect the bearing assembly and the magnetic encoder ring.

6. The combination of a sensor assembly and bearing assembly according to claim 1, wherein the clamp means includes a partial ring having two free ends, the partial ring engaging the extension portion of the bearing assembly outer ring and the two free ends of the partial ring removably engaging the sensor mount.

7. The combination of a sensor assembly and bearing assembly according to claim 1, wherein the outer ring of the bearing assembly includes a shoulder between rolling elements of the bearing assembly and the extension portion of the bearing assembly outer ring for preventing the rolling elements from interfering with proper operation of the magnetic encoder ring.

8. The combination of a sensor assembly and bearing assembly according to claim 1, wherein the outer ring of the bearing assembly includes two portions, a larger diameter portion and a smaller diameter portion, said smaller diameter portion being the extension portion of the outer ring, and wherein the bearing assembly includes rolling elements housed in the larger diameter portion, the magnetic encoder ring being housed in the smaller diameter portion.

* * * * *